(12) United States Patent
Lemonik et al.

(10) Patent No.: US 10,678,999 B2
(45) Date of Patent: Jun. 9, 2020

(54) REAL-TIME COLLABORATION IN A HOSTED WORD PROCESSOR

(71) Applicant: Google LLC, Mountain View, CA (US)

(72) Inventors: Micah Lemonik, Great Neck, NY (US); Olga Sergeyevna Saviano, Jersey City, NJ (US); Janani R. Ravi, Jersey City, NJ (US); Nicholas Cooper, Annandale (AU); Alexey Kalinichenko, New York, NY (US); John Day-Richter, Denver, CO (US)

(73) Assignee: Google LLC, Mountain View, CA (US)

( * ) Notice: Subject to any disclaimer, the term of this patent is extended or adjusted under 35 U.S.C. 154(b) by 816 days.

(21) Appl. No.: 14/989,417

(22) Filed: Jan. 6, 2016

(65) Prior Publication Data

US 2016/0117298 A1    Apr. 28, 2016

Related U.S. Application Data

(63) Continuation of application No. 13/271,682, filed on Oct. 12, 2011, now abandoned, which is a
(Continued)

(51) Int. Cl.
  *G06F 17/22*  (2006.01)
  *H04L 29/06*  (2006.01)
(Continued)

(52) U.S. Cl.
  CPC ............ *G06F 40/197* (2020.01); *G06F 40/14* (2020.01); *G06F 40/186* (2020.01); *H04L 67/02* (2013.01); *H04L 67/42* (2013.01)

(58) Field of Classification Search
  CPC .. G06F 17/30575; G06F 16/93; G06F 16/122; G06F 16/176; G06F 16/275;
(Continued)

(56) References Cited

U.S. PATENT DOCUMENTS 5,528,743 A    6/1996  Tou et al.
5,758,358 A    5/1998  Ebbo
(Continued)

OTHER PUBLICATIONS

Holzner et al., "Google™ Docs 4 Everyone," Chapters 4 and 5, Published Feb. 2009, 55 pages (IDS). (Year: 2009).*
(Continued)

*Primary Examiner* — Ariel Mercado
(74) *Attorney, Agent, or Firm* — Lowenstein Sandler LLP

(57) ABSTRACT

A computer-implemented method for coordinating documents between computer systems includes identifying, on a computing device, changes made by a user to a document having a model stored on the computing device, with corresponding models stored on a remote client and a server system; generating from the identified changes, one or more mutations that describe the changes and a one or more locations that correspond to positions in the model where the changes are to be provided; receiving one or more mutations from the server system and transforming the generated mutations using the received mutations; and updating the model stored on the computing device using the transformed mutations.

15 Claims, 7 Drawing Sheets

Related U.S. Application Data continuation of application No. 13/085,325, filed on Apr. 12, 2011, now abandoned.

(60) Provisional application No. 61/323,275, filed on Apr. 12, 2010.

(51) Int. Cl.
    *H04L 29/08*   (2006.01)
    *G06F 40/197*  (2020.01)
    *G06F 40/14*   (2020.01)
    *G06F 40/186*  (2020.01)

(58) Field of Classification Search
    CPC .............. G06F 11/3438; G06F 21/554; G06F 21/6272; G06Q 10/103
    USPC .................................................. 715/211, 255
    See application file for complete search history.

(56) References Cited

U.S. PATENT DOCUMENTS

| | | |
|---|---|---|
| 5,761,669 A | 6/1998 | Montague et al. |
| 5,793,966 A | 8/1998 | Amstein et al. |
| 5,895,476 A | 4/1999 | Orr et al. |
| 5,930,813 A | 7/1999 | Padgett et al. |
| 6,006,239 A | 12/1999 | Bhansali et al. |
| 6,049,239 A | 4/2000 | Dale et al. |
| 6,169,999 B1 | 1/2001 | Kanno |
| 6,243,706 B1 | 6/2001 | Moreau et al. |
| 6,327,584 B1 | 12/2001 | Xian et al. |
| 6,330,046 B1 | 12/2001 | Ishitaka et al. |
| 6,341,305 B2 | 1/2002 | Wolfe |
| 6,377,354 B1 | 4/2002 | Nguyen et al. |
| 6,418,441 B1 | 7/2002 | Call |
| 6,501,779 B1 | 12/2002 | McLaughlin et al. |
| 6,512,531 B1 | 1/2003 | Gartland |
| 6,662,210 B1 | 12/2003 | Carleton et al. |
| 6,705,584 B2 | 3/2004 | Hiroshima et al. |
| 6,708,309 B1* | 3/2004 | Blumberg ............... G06T 11/00 715/209 |
| 6,717,593 B1 | 4/2004 | Jennings |
| 6,737,289 B2 | 5/2004 | Woo et al. |
| 6,879,997 B1 | 4/2005 | Ketola et al. |
| 6,889,231 B1* | 5/2005 | Souder ................... G06F 16/27 |
| 6,967,704 B2 | 11/2005 | Hoshino |
| 6,972,748 B1 | 12/2005 | Lang |
| 6,983,316 B1 | 1/2006 | Bae et al. |
| 7,009,626 B2 | 3/2006 | Anwar |
| 7,026,100 B2 | 4/2006 | Nakata et al. |
| 7,031,954 B1 | 4/2006 | Kirsch |
| 7,035,910 B1 | 4/2006 | Dutta et al. |
| 7,039,643 B2 | 5/2006 | Sena et al. |
| 7,231,597 B1 | 6/2007 | Braun et al. |
| 7,287,094 B2 | 10/2007 | Mogul |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,529,778 B1 | 5/2009 | Dewey et al. |
| 7,624,145 B2 | 11/2009 | Junuzovic et al. |
| 7,656,543 B2 | 2/2010 | Atkins |
| 7,680,932 B2 | 3/2010 | Defaix et al. |
| 7,698,379 B2 | 4/2010 | Dutta et al. |
| 7,712,016 B2 | 5/2010 | Jones et al. |
| 7,774,703 B2 | 8/2010 | Junuzovic et al. |
| 7,792,788 B2 | 9/2010 | Melmon et al. |
| 7,836,148 B2 | 11/2010 | Popp et al. |
| 7,890,928 B2 | 2/2011 | Patrudu |
| 7,920,240 B2 | 4/2011 | Yonemura |
| 7,920,894 B2 | 4/2011 | Wyler |
| 7,953,696 B2 | 5/2011 | Davis et al. |
| 7,958,448 B2 | 6/2011 | Fattic, II et al. |
| 7,983,416 B2 | 7/2011 | Takashima et al. |
| 8,019,780 B1 | 9/2011 | Pinkerton et al. |
| 8,044,961 B2 | 10/2011 | Opstad et al. |
| 8,065,604 B2 | 11/2011 | Blankinship |
| 8,073,812 B2 | 12/2011 | Curtis et al. |
| 8,327,127 B2 | 12/2012 | Suryanarayana et al. |
| 8,327,812 B2 | 12/2012 | Vuk |
| 8,395,733 B2 | 3/2013 | Ataka et al. |
| 2001/0033917 A1 | 10/2001 | Sogabe et al. |
| 2002/0032701 A1 | 3/2002 | Gao et al. |
| 2002/0035580 A1 | 3/2002 | Tanabe |
| 2002/0133492 A1 | 9/2002 | Goldstein et al. |
| 2002/0174085 A1 | 11/2002 | Nelson et al. |
| 2003/0037076 A1 | 2/2003 | Bravery et al. |
| 2003/0037303 A1 | 2/2003 | Bodlaender et al. |
| 2003/0084078 A1 | 5/2003 | Torii et al. |
| 2003/0115268 A1 | 6/2003 | Esposito |
| 2003/0179230 A1 | 9/2003 | Seidman |
| 2004/0015781 A1 | 1/2004 | Brown et al. |
| 2004/0044965 A1 | 3/2004 | Toyama et al. |
| 2004/0085354 A1 | 5/2004 | Massand |
| 2004/0088374 A1 | 5/2004 | Webb et al. |
| 2004/0088653 A1 | 5/2004 | Bell et al. |
| 2004/0133444 A1 | 7/2004 | Defaix et al. |
| 2004/0133639 A1 | 7/2004 | Shuang et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0185636 A1 | 8/2005 | Bucher |
| 2005/0200896 A1 | 9/2005 | Narusawa et al. |
| 2005/0234943 A1 | 10/2005 | Clarke |
| 2006/0031751 A1 | 2/2006 | Ehud |
| 2006/0075332 A1 | 4/2006 | Fairweather et al. |
| 2006/0080601 A1 | 4/2006 | Weber et al. |
| 2006/0101071 A1 | 5/2006 | Henderson |
| 2006/0149795 A1 | 7/2006 | Gillespie et al. |
| 2006/0200755 A1 | 9/2006 | Melmon et al. |
| 2006/0230344 A1 | 10/2006 | Jennings et al. |
| 2006/0248121 A1 | 11/2006 | Cacenco et al. |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0073899 A1 | 3/2007 | Judge et al. |
| 2007/0094601 A1 | 4/2007 | Greenberg et al. |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0233811 A1 | 10/2007 | Rochelle et al. |
| 2007/0239695 A1 | 10/2007 | Chakra et al. |
| 2007/0239828 A1 | 10/2007 | Patton et al. |
| 2007/0279572 A1 | 12/2007 | Yonemura |
| 2007/0282914 A1 | 12/2007 | Sivapragasam et al. |
| 2007/0288637 A1 | 12/2007 | Layton et al. |
| 2007/0299857 A1 | 12/2007 | Gwozdz et al. |
| 2008/0028302 A1 | 1/2008 | Meschkat |
| 2008/0040659 A1 | 2/2008 | Doyle |
| 2008/0059539 A1 | 3/2008 | Chin et al. |
| 2008/0082604 A1 | 4/2008 | Mansour et al. |
| 2008/0126943 A1 | 5/2008 | Parasnis et al. |
| 2009/0112990 A1 | 4/2009 | Campbell et al. |
| 2009/0192845 A1 | 7/2009 | Gudipaty et al. |
| 2009/0235181 A1 | 9/2009 | Saliba et al. |
| 2009/0328063 A1 | 12/2009 | Corvera et al. |
| 2010/0030578 A1 | 2/2010 | Siddique et al. |
| 2010/0083096 A1 | 4/2010 | Dupuis-Latour et al. |
| 2010/0153948 A1 | 6/2010 | Schreiber et al. |
| 2010/0199191 A1 | 8/2010 | Takahashi |
| 2010/0218099 A1 | 8/2010 | van Melle et al. |
| 2010/0235763 A1 | 9/2010 | Massand |
| 2010/0241749 A1 | 9/2010 | Rasmussen et al. |
| 2010/0245256 A1 | 9/2010 | Estrada et al. |
| 2010/0251122 A1 | 9/2010 | Lee et al. |
| 2011/0018963 A1 | 1/2011 | Robinson |
| 2011/0066957 A1 | 3/2011 | Prats et al. |
| 2011/0085211 A1 | 4/2011 | King et al. |
| 2011/0154185 A1 | 6/2011 | Kern et al. |
| 2011/0178981 A1 | 7/2011 | Bowen et al. |

(56) References Cited

U.S. PATENT DOCUMENTS

| | | | |
|---|---|---|---|
| 2011/0302237 A1 | 12/2011 | Knight et al. | |
| 2012/0072819 A1 | 3/2012 | Lindner et al. | |
| 2012/0110445 A1 | 5/2012 | Greenspan et al. | |
| 2012/0331373 A1 | 12/2012 | Lindner et al. | |
| 2013/0218845 A1* | 8/2013 | Kleppner | G06F 17/24 707/687 |
| 2014/0033068 A1* | 1/2014 | Gupta | G06Q 10/103 715/751 |
| 2014/0040202 A1 | 2/2014 | Hagan et al. | |

OTHER PUBLICATIONS

Ellis et al., "Concurrency Control in Groupware Systems," ACM 1989, pp. 399-407 (IDS). (Year: 1989).*
Beresford et al., "MockDroid: Trading Privacy for Application Functionality on Smartphones," HotMobile '11, Mar. 1-3, 2011, Phoenix, AZ, USA, pp. 49-54.
Bibi et al., "A Platform for Delivering Multimedia Presentations on Cultural Heritage," 2010 14th Panhellenic Conference on Informatics, pp. 175-179.
Burigat et al., "Visualizing locations of off-screen objects on mobile devices: A Comparative Evaluation of Three Approaches," Proceedings of the 8th Conference on Human-Computer Interaction with Mobile Devices and Services, MobileHCI '06, Sep. 12-15, 2006, pp. 239-246, XP055107181, DOI: 10.1145/1152215.1152266, ISBN: 978-1-59-593390-4.
Cairns et al., "System and Method of Document Embedding in Collaborative Editors," unpublished U.S. Appl. No. 13/493,672, filed Jun. 11, 2012, pp. 1-48.
Cayenne-McCall, Lawrence. "Synchronous 3D Document Collaboration," Pace University, Department of Computer Science; Nov. 2008, (42 pages).
Chevalier et al., "Using Text Animated Transitions to Support Navigation in Document Histories," Proceedings of the 28th International Conference in Human Factors in Computing Systems, Apr. 10-15, 2010, pp. 683-692.
Citro, "Conflict Management for Real-Time Collaborative Editing in Mobile Replicated Architectures," 2007, Australian Computer Society, Inc., Thirteenth Australian Computer Science Conference (ACSC2007), pp. 115-124.
Conner, "Zoho® 4 Everyone," 2008, downloaded from the internet http://techbus.safaribooksonline.com/print?xmlid=9780768687835/ch011ev1 sec1 , Aug. 21, 2012, p. 1-17.
Day-Richter et al., "System and Method for Managing Remote Procedure Calls Relating to a Third Party Software Application," unpublished U.S. Appl. No. 13/591,851, filed Aug. 22, 2012, pp. 1-98.
Day-Richter et al., "System and Method for Performing Data Management in a Collaborative Development Environment," unpublished U.S. Appl. No. 13/591,734, filed Aug. 22, 2012, pp. 1-101.
De Lara, Eyal et al., "Puppeteer: Component-based Adaptation for Mobile Computing," Proceedings of the 3rd USEIX Symposium on Internet Technologies and Systems, Mar. 27, 2001, (14 pages).
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www .computerworld. com/s/article/pri nt/91 08 799/0n line_ office_ apps get_real_ GoogleDocs vs ThinkFree vs. Zoho> (7 pages).
Ellis et al., "Concurrency Control in Groupware Systems," ACM 1989, pp. 399-407.
Ellis et al., "Groupware Some Issues and Experiences," Communications of the Association for Computing Machinery, ACM, vol. 34, No. 1, Jan. 1991, pp. 38-58.
EP Appln. No. 11717829.3 European Office Action dated Mar. 17, 2014.
Ferreira et al., "Evaluating Shared Workspace Performance Using Human Information Processing Models," Information Research, vol. 14, No. 1, Mar. 2009.
File; Microsoft Computer Dictionary; May 1, 2002; Microsoft Press; Fifth Edition, p. 266.
Fraser, Neil, "Differential Synchronization," Google; Munich, Germany; 2009. (8 pages).
Grieve et al., "Systems and Methods for Collaborative Document Editing," unpublished U.S. Appl. No. 13/297,762, filed Nov. 16, 2011, pp. 1-49.
Gutwin et al., "Improving Network Efficiency in Real-Time Groupware with General Message Compression," University of Saskatchewan, Canada; University of Canterbury, New Zealand; Nov. 4-8, 2006, (10 pages).
Gutwin et al., "The Effects of Workspace Awareness Support on the Usability of Real-Time Distributed Groupware," ACM Transactions on Computer-Human Interaction, vol. 6, No. 3, Sep. 1999, pp. 243-281.
Herrick, "Google This! Using Google Apps for Collaboration and Productivity," Proceedings of the ACM SIGUCCS Fall Conference on User Services Conference, SIGUCCS '09, Oct. 11-14, 2009, p. 55-63.
Hodel et al., "Supporting Collaborative Layouting in Word Processing," University of Zurich, Department of Informatics; Zurich, Switzerland, 2004 (18 pages).
Holzner et al., "Google™ Docs 4 Everyone," http://www.scribd.com/doc/14119795/Google-Docs-4-Everyone, Chapters 4 and 5, Published Feb. 2009, 55 pages.
"How to track and manage changes in a Word 2002 and a Word 2003 document," Microsoft Support, at least Mar. 5, 2008, available at http://support.microsoft.com/kb/305216 (3 pages).
http://web.archive.org/web/20120512130530/https://developer.mozilla.org/en/Setting_up_extension_development_environment, 7 pages, May 12, 2012.
http://web.archive.org/web/20120819143535/https://addons.mozilla.org/en -US/firefox/extensions/?sort=featured, Aug. 19, 2012, retrieved from internet on Dec. 13, 2013, 3 pages.
http://web.archive.org/web/20121020134710/https://addons.mozilla.org/en -US/seamonkey/extensions, retrieved from internet Dec. 13, 2013, 3 pages.
http://web.archive.org/web/20121021135356/http://support.mozilla.org/en -US/kb/find-and-install-add-ons-add-features-to-firefox, retrieved from internet Dec. 13, 2013, 3 pages.
http://www-archive.mozilla.org/projects/webservices, Snapshot taken on Apr. 21, 2008, 4 pages.
Huang et al., "A General Purpose Virtual Collaboration Room," Google, 1999, pp. 1-9.
Ignat et al., "CoDoc: Multi-mode Collaboration over Documents," ETII Surich, Institute for Information Systems; Zurich, Switzerland, 2004 (15 pages).
Jason Hill & Carl Gutwin, "The MAUI Toolkit: Groupware Widgets for Group Awareness," pp. 539-571 in Computer Supported Cooperative Word (2004) 13, (copyright 2005) ("MAUI").
Junuzovic et al., "Read, Write and Navigation Awareness in Realistic Multi-View Collaborations," International Conference on Collaborative Computing: Networking, Applications and Worksharing, 2007, pp. 494-503.
Kjaer, "Timing and Synchronization in JavaScript," Dev. Opera, Sections: "The Basics", "Event Queing", "Long Running Scripts" and "Advice on Timing", Feb. 27, 2007, downloaded from URL: http/dev.opera.com/articles/view/timing-and-synchronization-injavascript/, pp. 1-9.
Krieger, "Documents, Presentations, and Workbooks: Using Microsoft® Office to Create Content That Gets Noticed," published May 4, 2011, pp. 1-104.
Lemonik et al., "System and Method for Providing Data Management Services," unpublished U.S. Appl. No. 13/224,860, filed Sep. 2, 2011, pp. 1-88.
Lemonik et al., "System and Method for Using a Third-Party Add-On in a Collaborative Online Software Development Environment," unpublished U.S. Appl. No. 13/551,859, filed Jul. 18, 2012, pp. 1-103.
Lemonik et al., "System and Method for Providing Access to a Document Associated with a Third Party Software Application via Interframe Communication," unpublished U.S. Appl. No. 13/224,769, filed Sep. 2, 2011, pp. 1-90.

(56) References Cited

OTHER PUBLICATIONS

Lemonik et al., "System and Method for Providing Real-Time Collaborative Document Editing Services," unpublished U.S. Appl. No. 13/224,573, filed Sep. 2, 2011, pp. 1-90.
Lemonik et al., "System and Method for Updating an Object Instance Based on Instructions Received from Multiple Devices," unpublished U.S. Appl. No. 13/282,636, filed Oct. 17, 2011, pp. 1-91.
Lemonik et al., "System and Method for Updating an Object Instance Based on Instructions Received from Multiple Devices," unpublished U.S. Appl. No. 13/224,479, filed Sep. 2, 2011, pp. 1-91.
Lemonik et al., "System and Method for Using a Third-System and Method for Using a Third-Party Add-On to Manipulate a Document in a Collaborative Online Software Development Environment," unpublished U.S. Appl. No. 13/551,772, filed Jul. 18, 2012, pp. 1-119.
Lemonik et al., "System and Method to Provide Collaborative Document Processing Services via Interframe Communication," unpublished U.S. Appl. No. 13/224,663, filed Sep. 2, 2011, pp. 1-90.
Masoodian, M., et al., "RECOLED: A Group-Aware Collaborative Text Editor for Capturing Document History," In Proceedings of IADIS International Conference on WWW/Internet, Lisbon, Portugal, Oct. 19-22, 2005, International Association for Development of the Information Society, vol. 1, pp. 323-330.
Miller, M. "Googlepedia: The Ultimate Google Resource," Third Edition, 2008, pp. 275-291.
Muhammad et al., "Awareness Elements in Web-Based Cooperative Writing Applications," 2009 Second Asia-Pacific Conference on Computational Intelligence and Industrial Applications, pp. 345-348, (2009).
Munteaunu et al., "Collaborative Editing for Improved Usefulness and Usability of Transcript-Enhanced Webcasts," CHI 2008, ACM 2008 Proceedings, Apr. 5-10, 2008, pp. 373-382.
Nasir et al., "Collaborative Report Creation System for Industrial Use," Yamagata University, Graduate School of Science and Engineering; Yamagata, Japan, 2009 (6 pages).
Nauman et al., "Apex: Extending Android Permission Model and Enforcement with User-Defined Runtime Constraints," ASIACCS '10 Apr. 13-16, 2010, Beijing, China, pp. 326-332.
Pacull et al., "Duplex: A Distributed Collaborative Editing Environment in Large Scale," ACM 1994, pp. 165-173.
Pereira et al., "Merging Electronic Document Redraws," unpublished U.S. Appl. No. 13/006,259, filed Jan. 13, 2011, pp. 1-30.
Pereira et al., "Merging Electronic Document Redraws," unpublished U.S. Appl. No. 13/282,753, filed Oct. 27, 2011, pp. 1-30.
Quinn, "Comparing Online vs. Traditional Office Software, Will desktop or online office software fit your non-profit needs best?" May 21, 2010, courtesy of Idealware, TechSoup.org [online]. Retrieved from the Internet L:http://www.techsoup.org/learningcenter/software/page11852.cfm (4 pages).
Raman, T.V., "Cloud Computing and Equal Access for All," Google Inc., 2008 (4 pages).
Shen et al., "Flexible Merging for Asynchronous Collaborative Systems," from on the Move to Meaningful Internet Systems 2002: CoopIS, DOA, and ODBASE, 2002, LNCS 2519, Springer-Verlag Berlin Heidelberg, XP55000894, ISBN: 978-3-54-000106-5, pp. 304-321.
Shen et al., "Flexible Notification for Collaborative Systems," School of Computing and Information Technology, Griffith University, Australia, Nov. 16-20, 2002, pp. 77-86.
Shen et al., "Integrating Advanced Collaborative Capabilities into Web-Based Word Processors," Nauyang Technological University, School of Computer Engineering; Singapore, 2007, pp. 1-8.
Simultaneously Edit a Presentation With Other Authors, by MicrosoftTM Office: MAC, published Nov. 11, 2010, pp. 1-4.
Sun et al., "Operational Transformation in Real-Time Group Editors: Issues, Algorithms, and Achievements," 1998, ACM Conference on Computer-Supported Cooperative Work, pp. 1-10.
Taylor, "Cool Apple Keynote Presentation Tricks and Tips," published Apr. 2011, p. 1-5.
The OAuth 2.0 Authorization Protocol; draft-ietf-oauth-v2-24, Mar. 8, 2012.
"Use a Shared Workbook to Collaborate," Nov. 9, 2006, https://support.office.com/en-ca/article/Use-a-shared-workbook-to-collaborate-b8207fe9-a613-483f-b804-0ca4658b0c61?CorrelationId=f94b6a6f-429e-40f1-a2c5-4d67e8513591&ui=en-US&rs=en-CA&ad=CA, printed from the internet on Aug. 24, 2015, 8 pages.
"Using Adobe Buzzword," Adobe Systems Inc. and its Licensors, 2008, pp. 1-32.
"Using Adobe Flash Professional CS5 & CS5.5," Jan. 16, 2012, Adobe Systems Incorporated, 7 pgs., http://help.adobe.com/en_US/flash/cs/using/flash_cs5_help.pdf.
Wang et al.. "Google Wave Operational Transformation," Version 1.1, Jul. 2010, pp. 1-6, retrieved from the Internet Feb. 14, 2012: http://1wave-protocol.googlecode.comfhg/Whitepapers/operational-transform/operational-transform.html.
Wikipedia, "Operational Transformation," http://en.wikipedia.org/wiki/Operation_transformation, Jun. 3, 2008. Retrieved from Internet: http://web.archive.org/web/20080603061805/http://en.wikipedia.org/wiki/Operational_transformation.
Wikipedia, the free encyclopedia, "Model-View-Controller," downloaded on Nov. 16, 2010 [online]. Retrieved from the Internet: URL:http://en.wikipedia.org/wiki/Modei%E2%80%93view%E2%80%93controller, pp. 1-10.
Zafer, Ali Asghar, "NetEdit: A Collaborative Editor," Blacksburt, Virginia; Apr. 23, 2011, (89 pages).
Zhou et al., "Taming Information-Stealing Smartphone Applications (on Android)," TRUST 2011, LNCS 6740, pp. 93-107, 2011.

\* cited by examiner

REAL-TIME COLLABORATION IN A HOSTED WORD PROCESSOR

CROSS-REFERENCE TO RELATED APPLICATIONS

This application claims priority to and is a continuation of currently pending U.S. patent application Ser. No. 13/271,682, filed Oct. 12, 2011, which in turn is a continuation of U.S. patent application Ser. No. 13/085,325, filed Apr. 12, 2011, entitled "Real-Time Collaboration in a Hosted Word Processor," which claims priority to U.S. Provisional Application Ser. No. 61/323,275, filed on Apr. 12, 2010, entitled "Real-Time Collaboration in a Hosted Word Processor." The entire contents of the aforementioned applications are hereby expressly incorporated by reference.

TECHNICAL FIELD

This document relates to systems and techniques for managing a browser-based word processor or other form of document manager that interacts with a hosted server system to permit collaboration by multiple users in a document.

BACKGROUND

Cloud-based, or hosted, computing generally involves executing applications via a web browser, and obtaining information for the applications from a remote server system or service. Various applications are available from hosted services, including search engines, maps services, and productivity applications such as word processor and spreadsheet programs that run by loading executing HTML and JavaScript code from the server system to a browser running on a client computing device that is remote from the server system.

Cloud computing provides real advantages over traditional desktop software, such as the ability to access documents from various different computers and locations. Web browsers do, however, place a number of limits on programs that run on them. For example, web browsers may offer programmers HTML elements that are very simple to implement but can be rather inflexible. As one example, a browser text box can be a simple way for a programmer to acquire textual input from a user of a browser, but the manner in which the text is presented is relatively bland. Also, browsers do not provide access to native text rendering capabilities, do not generally permit much flexibility in positioning images on a web page, and cannot natively execute other functions that are expected from a full-featured word processor application.

SUMMARY

This document describes systems and techniques that may be employed by users of hosted word processing and similar applications to collaborate in the editing of documents. For example, as described here, a server system can share a model for a document with multiple client computing devices, and the client computing devices can send changes, or mutations, made by their users to the server system regularly, such as multiple times a second or for every keystroke or icon/menu selection. Each of the clients and the server may have complementary rules that they apply in order to resolve conflicts in overlapping edits, such as when one user edits part of a document at substantially the same time that another user is deleting the entire phrase. In the techniques discussed here, operational transformation features may be employed in browser-based word processors so that mutations or changes to a shared document can be made optimistically by client devices, but the server can ensure that all versions of the document model converge toward one true version.

As described here, in general, each client device may cache information regarding the locations in a document where the device has made changes to the model, and the nature of those changes. Such change information may be regularly uploaded to a server (e.g., multiple times per second when the changes, such as keystrokes in a document, are occurring) that is coordinating the word processing applications (or other applications such as spreadsheet applications). Each client may maintain a list of pending mutations that have not yet been sent to the server, and may transform such mutations against any mutations that the server may send to the client—e.g., that started at one of the other clients. As a result, the client's list of pending mutations will always be valid for the document state as of the client's last synchronization with the server system. When a client does send change information up to the server system, it may also send information that allows the server system to identify the client's last synchronization, so that the server system can transform the client's changes against all changes that have occurred since the last synchronization by the client.

Such features may, in certain implementations, provide one or more advantages. For example, a rich browser-based word processing application can be provided to users, so that they can receive the various benefits of cloud computing (e.g., access from a common browser interface, access without needing to buy and/or download special non-browser application, and ability to share documents more easily across the internet) with the power and flexibility of traditional desktop applications (e.g., WYSIWYG presentation of document) and other features, such as real-time collaborative document editing among multiple users. Multiple users may also be able to use their client systems on the same document, so that wasteful individual editing sessions may be avoided, or conference calls in which users waste time explaining to a single person who has control of the document what to do with the document's edits.

In one implementation, a computer-implemented method for coordinating documents between computer systems is disclosed. The method comprises identifying, on a computing device, changes made by a user to a document having a model stored on the computing device, with corresponding models stored on a remote client and a server system; generating from the identified changes, one or more mutations that describe the changes and a one or more locations that correspond to positions in the model where the changes are to be provided; receiving one or more mutations from the server system and transforming the generated mutations using the received mutations; and updating the model stored on the computing device using the transformed mutations. The model stored on the computing device can comprise a one-dimensional character string that includes content for the document, and a style map having pointers to indexed locations in the character string.

In another implementation, computer-implemented system for coordinating electronic document changes between computer systems is disclosed. The system includes a document model stored on a first client computing device that defines content and formatting for an electronic document; a layout engine in communication with the document model and programmed to render the document model to a document object model (DOM) that is accessible to a web browser that is executable on the first client computing device; and a mutation resolver on the client computing device programmed to transform mutations made to the model on the first client computing device that have not been transmitted to a server system, using mutations sent to the first client computing device by the server system, and then applying the transformed mutations to the model on the first client computing device.

In yet another implementation, a computer-implemented system for coordinating electronic document changes between computer systems comprises a document model stored on a first client computing device that defines content and formatting for an electronic document; a layout engine in communication with the document model and programmed to render the document model to a document object model (DOM) that is accessible to a web browser that is executable on the first client computing device; and means for resolving conflicting time-wise overlapping mutations made by the first client computing device and one or more other client computing devices.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for browser-based word processing applications. As discussed in more detail below, a client-based application that runs in a web browser, such as using HTML and JavaScript code, may download a portion of a document model from a server system that hosts the online word processing functionality. The application may create a user interface with the browser, and may place an editing surface on the display of the browser where the body of the document is to be displayed. The application may intercept keystrokes and other inputs by the user and may determine how the inputs are to be displayed by placing them in an off-screen or a highly minimized HTML span element, and measuring the size of such an element to determine the size of the characters when they are properly displayed. The application may also display a synthetic cursor on the editing surface and use the measurements from the span element to determine the location at which to index the cursor after the user has typed a character or made other changes to the document. As the user makes such changes, the changes may be added to the local model, and may in turn be added to the display in the browser by rendering the model or the changes to the model into a document object model (DOM) that is accessed by the browser in a familiar manner.

Figure 1:
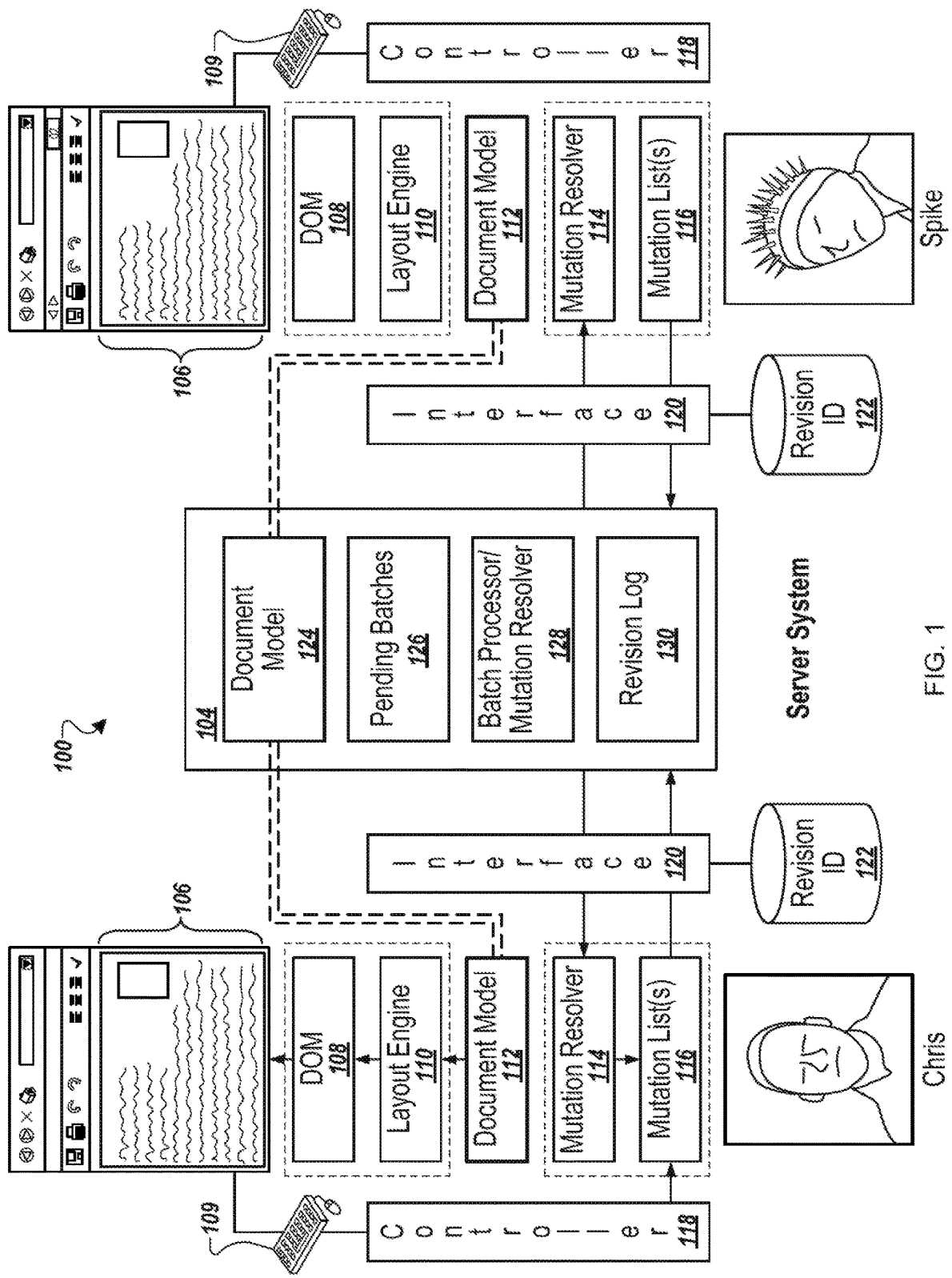
FIG. 1 is a conceptual diagram of a browser-based word processing system for collaborative editing of documents.

FIG. 1 is a conceptual diagram of a browser-based word processing system 100 for collaborative editing of documents. In general, the system 100 revolves around two users, named Chris and Spike, who are accessing and editing a document together in a collaborative manner. Each of the users has a similarly configured client subsystem, because each has individually accessed a server system 104 and downloaded to their browsers equivalent program code, such as in the form of HTML and JavaScript code. The two users in this example are currently viewing and editing the same document at the same time, and the system 100 is in charge of coordinating such activities by the two users.

The system 100 centers around individual copies of a document model 112, 124, and efforts to optimistically update the copies of the document model so that the server system 104 and the two users are experiencing the same document, or are at least converging quickly (within seconds or less than a second) toward the same document. Rows of equal signs are shown in the figure between the document models 112 at the clients, and the document model 124 at the server system 104, in order to emphasize this effort to effectively match the document models with each other when overlapping edits are being made to document model 112 at Chris's machine, and document model 112 at Spike's machine.

The document models may be updated at each of the machines by applying certain transformation rules to pending changes, or mutations, that may be applied to a model. For example, each of the clients may be forced to transform their own inputs to a document so that their changes reflect changes received from other users via the server system 104, before applying those changes to their own copy of the model 112. The various subcomponents in each of the client and server subsystems shown here provide examples of components that may achieve such coordinated editing of the document.

Referring now to particular components on the client devices, these subsystems are generally implemented as so-called model-view-controller implementations, where a model of a document may be maintained on a client, the model may be rendered to create a view of the document model which may cover all of a document model or a portion of the document model, and a controller may intercept inputs made by a user with respect to the document, such as mouse clicks, keyboard and trees, and the like. The controller may then process such inputs to create changes to the document model, and those changes may then be reflected in the view when the updated document model is rendered to the view.

As shown here, each client computer communicates with the server system 104 through an interface 120. The interface 120 may take various forms, but may include functionality for providing the server system 104 with relevant information needed for the server system to maintain coordination between the clients. Particular types of such information are described more completely below. One type of information needed to maintain coordination by the server system 104 is revision identification information from data store 122. Such information may be used to indicate the status of the most recent batch of mutations that have been synchronized between the particular client and the server system 104, so that transformations of mutations may be applied in the appropriate direction (i.e., so that it can be determined which transformations "trump" other transformations) and appropriate batches of mutations may be transformed against each other, whether at the server system 104 or at the clients. As noted, mutations may be provided at the clients by various input mechanisms such as a keyboard 109, a mouse, a touchscreen computer input, or other appropriate mechanisms. These inputs create the mutations that need to be coordinated by the system 100.

Such mutations or inputs may be captured or intercepted by a controller 116. The controller 116 may use such inputs to identify and generate mutations corresponding to the user inputs. For example, if a user types several characters at a particular location in a document, the controller 118 may generate a string that indicates the characters that were entered, and that recites a position in the model where such characters are to be added to the model.

Each client may process individual mutations and submit individual mutations to the server system 104, such as by sending every keystroke received at the client computer up to server system 104 as a mutation. Alternatively, or at different times, multiple mutations may be gathered together and stored as mutation lists 116, or mutations batches. Such caching of mutations may be beneficial, for example, when a user is typing very quickly, and a number of characters may be processed together to increase the efficiency of the system 100, while not slowing down the responsiveness of the system 100. Thus, for example, when a client device is quiet for a long time and a first mutation is identified for the device (e.g., the user presses a key), a client application may begin a timer, such as a timer set to expire in 200 ms or a similar time, and may cache all mutations received during that time, before processing and uploading the mutations as a batch.

A mutation resolver 114 on each client device may implement various operational transformation rules and techniques so that overlapping or interfering mutations may be processed properly, and so that the models 112, 124 in the system are all processed in a similar manner so that they can be expected to match after the processing is complete. Particular rules or techniques for resolving different batches of mutations from different users are described in more detail below, such as with respect to FIGS. 3A, 3B, and 4.

When a client has resolved particular mutations so as to determine what changes need to be made to a document model 112, the document model 112 may be updated, such as by the controller 118. The display 106 of the document may then be updated so that the user at the appropriate client can see changes that he has made, and also changes that the other user has made, in a relatively responsive and accurate manner. Such generation of a new display 106 may occur using a layout engine 110 and a document object model (DOM) 108. The layout engine 110 may be programmed to process the document model 112 into the DOM 108. The document model 112 may take a variety of forms, including a one-dimensional character string that includes the content of the document and that is supplemented by a sparse style map that represents formatting or styling for the characters and other items in the model 112. The layout engine 110 may parse through the character string and apply formatting from the style map to generate HTML that synthetically creates a display 106 that looks or appears in a manner that the user intended. For example, each item in the display 106, such as each character in a written document, may be generated in an off screen span element using appropriate formatting, and the size of that element may be determined using standard HTML elements. Each character that is processed in this manner may then be placed on an editing surface of the display 106 at the appropriate location, and the location for the next character may be indexed forward by the width that was determined for the previous character. A defined width (equivalent to page margins) may be applied for each line, so that when the position of a character for a word exceeds that width, the position for all the characters of that word may be shifted to the beginning of the next line (e.g., implementing a word wrap feature). Also, a cursor may be shown on the display 106 at an appropriate location as determined by the controller 118, and may be a standard HTML element, such as a span element having a narrow width, and rendered in a background color that contrasts with the background color of the display 106, so that a user may locate the cursor easily.

The layout engine 112 can perform its processing in this manner, and generates, as an output, the DOM 108. Each user's browser may then use standard techniques to convert the DOM on that particular client device into display 106 for interacting with the relevant user.

Turning now to components used in the server system 104, there is provided, in addition to the document model 124, a number of components that are used to coordinate edits to a document made by user Chris and user Spike. For example, a pending batches storage area 126 receives mutation batches that have been submitted by the clients, and holds them until they may be processed. A batch processor or mutation resolver 128 is responsible for applying operational transformations to the mutation batches using rules or approaches like those discussed above and below. For example, a server system 104 may resolve a newly-received batch of mutations from a client against all mutations that have been received since the last time the client was synchronized with the server, so that the new mutations from that client do not take precedence over mutations have been received previously from other clients.

A revision log 130 may be used in order to perform such comparisons. In particular, mutation batch is received from the various clients may be maintained in the mutation log 130, which may include identifiers for particular mutation batches, or revisions, received from each of the clients. These identifiers may then be used to identify or determine all of the mutations that have arrived since the previous synchronization with the particular client, and the identified mutations from the log may have newly received mutations transformed against them, in determining how the newly receive mutations are to affect the document model 124. Particular techniques for applying such transformations are described in more detail below with respect to FIGS. 3A, 3B, and 4.

We now discuss in more detail the arrangement of an example model-view-controller client arrangement, and additional structures and other components that may be implemented in a collaborative document editing system.

Figure 2A:
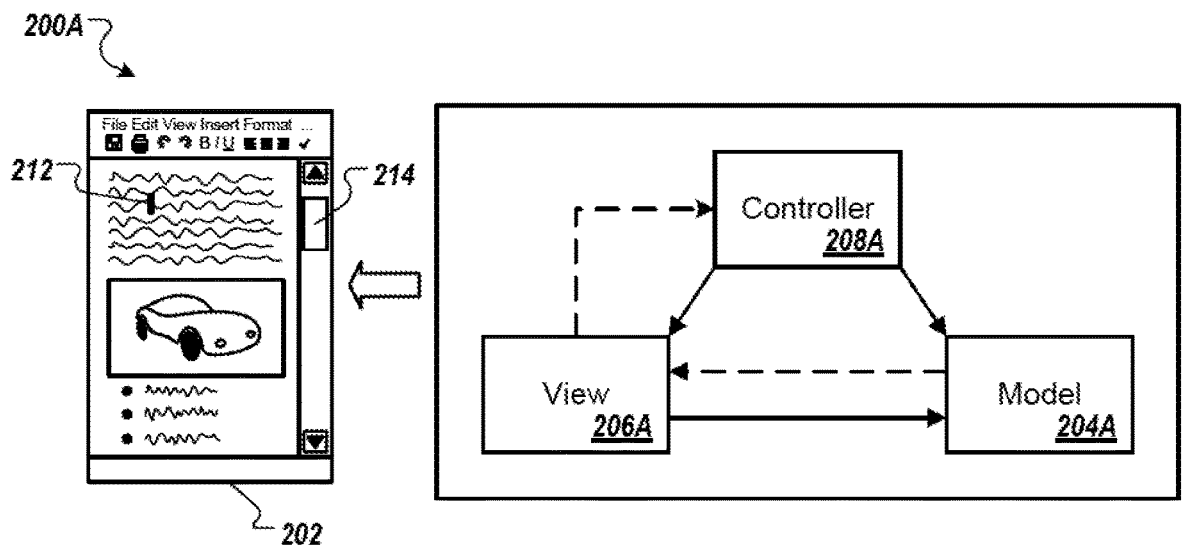
FIGS. 2A and 2B are block diagrams showing components of a model-view-controller implementation of a spreadsheet application.
Figure 2B:
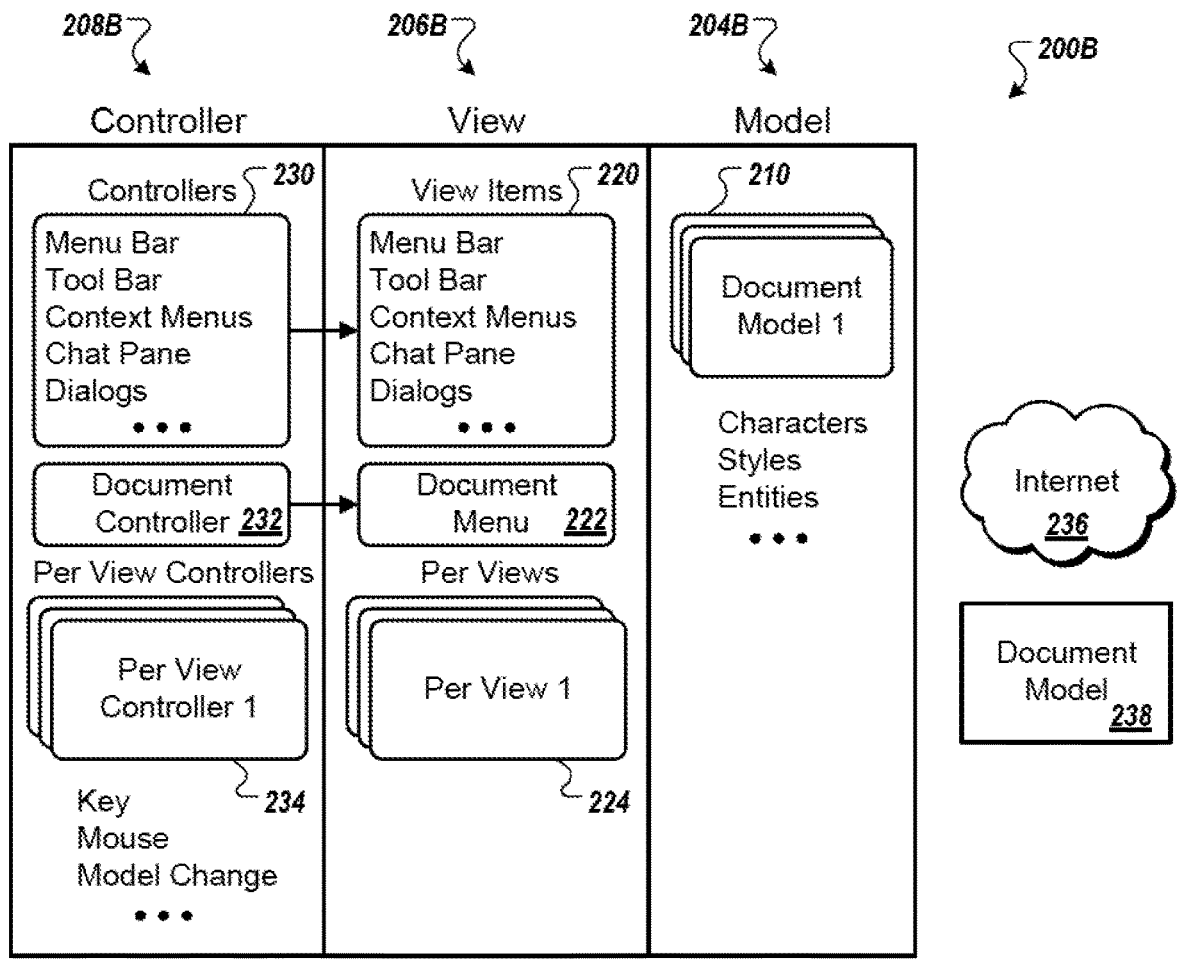

FIGS. 2A and 2B are block diagrams showing components of a model-view-controller (MVC) implementation of a word processing application. The word processing application, for example, may be executed by a web browser, such as the browser 104 shown in FIG. 1. In general, the MVC implementation provides for the download of a model from a remote server to a client, and the rendering of the model into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server (e.g., uploading changes or mutations back to the server, which may be programmed with rules for integrating the mutations into a master model, so that the client-side model matches the master model as the user works).

Referring to FIG. 2A, a computer application 200A may be configured to display a word processing document 202. The application 200A includes, controls, or accesses a model 204A, a view 206A, and a controller 208A. For example, the model 204A can contain a representation of the state of the word processing document 202, including such elements as character data, formats, styles, paragraphs, sections, breaks, lists, tables, images, formulas, and the like. The view 206A can represent a rendering of the current state of the model 204A. For example, the view can provide a visual representation that combines the substance of the document (e.g., its raw text) with formatting and layout information. The view, when displayed by a browser, provides a form of, if not an exact, WYSIWYG representation of the document that is defied by the model.

In addition to the rendering of the model, the view 206A can be used for presenting to the user visual information that is associated with the word processing document 202, such as visible user controls for the application (i.e., chrome) and other word processing data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, listening for user interaction (e.g., provided by user controls) with the presentation of the view 206A, the controller 208A can modify the model 204A, and can in turn modify the view 206A either directly or indirectly (by causing the view 206A to obtain new model data and render that new data).

As another example, listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system (and edits by the first user may be passed from the client device to the server system), and the client code may add characters to the model in near real-time, and those changes can be passed into the DOM (e.g., via rendering by the view 206A)—so that each user can see the edits made by the other users very quickly.

Referring to FIG. 2B, the model-view-controller implementation as presented in FIG. 2A is shown with additional detail. As shown, a computer application 200B (corresponding with the application 200A) includes, controls, or accesses a model 204B (corresponding with the model 204A), a view 206B (corresponding with the view 206A), and a controller 208B (corresponding with the controller 208A).

The model 204B can include one or more document models 210. Each of the document models 210 can represent a separate document in a collection of word processing documents, for example, and each of the models 210 can include elements such as characters, styles, and entities. Other forms of documents such as spreadsheet documents may also be represented. Model data and elements may be provided by a master document model 238 that is stored on a remote server system via a connection to a network 236 (e.g., the internet).

Generally, document text in the models 210 is associated with a series of characters. For example, the characters may represent raw text for the word processing document 202, and may also include certain reserved control characters such as characters that indicate the occurrence of a break (e.g., a paragraph break, a page break, or the like). In some implementations, each of the document models 210 can include a one-dimensional character string that includes document characters in an order in which they appear in the document.

Styles may be used to store information related to the presentation of document text (e.g., the series of characters). For example, text styles may include character formatting attributes such as font, font size, bold, italics, underline, foreground and background colors, alignment, and other such attributes. In some implementations, styles included in each of the document models 210 can be stored in a sparse map. For example, the sparse map can include markers that correspond to changes in styles in the document and pointers to positions in the character string. The pointers, for example, can define style runs between matched markers by specifying locations along the character string at which style changes occur. In some implementations, the markers in the matched set may be arranged to be tethered to certain characters in the one-dimensional character string. For example, if text is added between two paired markers, the pointer for one of the markers may shift by an integer equal to a number or characters associated with the added text.

Entities in each of the models 210 may be used to store information related to objects outside of the document models 210, and may be pointed to by references in the model such as in the one-dimensional character string. For example, entities may include objects such as lists, tables, images, and the like. In some implementations, the references can include object identifiers and pointers to the one-dimensional character string (e.g., from the sparse map) indicating where in the character string the object should appear, or identifiers from within the character string that point to the entities and mark the locations at which the particular entities are to appear in the document when it is rendered and displayed. For example, an image that should appear between two paragraphs may be associated with a special character appearing in the character string after a paragraph marker for one paragraph, and before the first character of the next paragraph.

The view 206B can generate one or more view items 220 that may enable the user to interact with the application 200B, such as menu bars, tool bars, context menus, chat panes, dialogs, other chrome, and the like. The view 206B can also include a document menu 222 that presents information and control options related to one or more of the document models 210, and one or more of a set of per views 224. For example, one of the per views 224 may be associated with a corresponding one of the sheet models 210. Each of the per views 224 may include components or controls such as selectors (e.g., cursors, selection indicators, and the like) navigation tools (e.g., scrollbars, document maps, outlines, and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth. The determination that a particular event has occurred may cause a particular controller 230 to execute predetermined code or otherwise carry out a predetermined process, such as by updating a local model when a key press is received and uploading information about the key press to a central server system.

The controller 208B can also include a document controller 232 that may listen for and handle user interactions with the document menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208B can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send the updated model or just data for the particular mutations to the remote server system that hosts the document model 238 via the network 236.

The controllers may also use timers or other mechanisms to aggregate inputs or mutations, so as to lower the number of updates that need to be made to the local or server-based models. For example, the controllers may implement changes to the local and/or server-based model in batches that occur within predefined time windows, such as by waiting 200 ms after an initial keystroke is sensed before sending to the central server system data about all keystrokes received in the time window.

Many possible user interactions with the application 200B are possible, including interactions that are included in single-user sessions and in multiple-user sessions. For purposes of illustration, a series of example user interactions with the application 200B are described here. For example, to enter text into the word processing document 202, the user may proceed by using a computer mouse to select a desired document location 212 for text insertion by clicking on the document 202. A mouse controller that is included in the per view controllers 234 (e.g., a per view controller associated with the active document 202) can listen for an event that is associated with the mouse positioning input and the mouse click input, and upon intercepting it, can modify the view 206B (e.g., a per view associated with the active document) to provide the user with a visual indicator for the selection (e.g., a cursor). For example, the selected location 212 may be associated with a visible cursor (where the cursor is a graphical HTML element such as an image, and is displayed at an appropriate location on a canvas where the document is also being displayed so as to create a synthetic presentation that makes the graphical element look like a true cursor), may be highlighted, or may receive another such modification. Additionally, the selected location 212 may also be associated with a location in the model 204B. For example, a position in a one-dimensional character string included in the document models 210 can be determined, based on the selected location 212.

Using a keyboard, the user may enter desired text at the document location 212. A keyboard controller that is included in the per view controllers 234 can listen for events associated with the keyboard input, and upon intercepting them, can modify the view 206B to provide the user with a visual indicator for the input. For example, as the user types text at the location 212, the document 202 may be visually updated to present the text to the user. Additionally, the keyboard controller can modify the model 204B to include entered text by copying the user input to the model. For example, a one-dimensional character string included in the document models 210 can be updated to include the entered characters. Additionally, the document model 238 may be updated to include the entered text, thus coordinating the model 204B with the document model 238. For example, changes to the model 204B may be transmitted to the document model 238 via a connection to the network 236. In some implementations, changes may be sent periodically (e.g., once every 100 milliseconds, once every 200 milliseconds, once every 500 milliseconds, once every second, once every 2 seconds, or another appropriate time interval). In some implementations, changes may be sent based on user activity (e.g., entering a paragraph break, applying a formatting change, navigating to another document section, clicking a save button, or some other action).

As another example, the user may insert an entity (e.g., a list, a table, a hyperlink, an image, or another such object) into the document 202. For example, the user may proceed by using a computer mouse to select a desired document location (e.g., the location 212) for entity insertion by clicking on the document 202. Similar to interactions associated with text entry, for example, a mouse controller included in the per view controllers 234 can listen for an event associated with the mouse positioning input and the mouse click input, and upon intercepting it, can modify view 206B to provide the user with a visual indicator for the selected location. Next, for example, the user may specify the entity for insertion by interacting with one of the view items 220 or with the document menu 222. For example, the user may make a selection on a menu bar to indicate an intent to insert an image. A dialog associated with image selection may be presented to the user, enabling the user to select the desired image.

Model-view-controller interactions for adding the entity within the application 200B may operate in a similar manner as when a user is entering text. For example, as the user inserts the image at the location 212, the document 202, as it is displayed on an editing surface, may be visually updated to present the image to the user. Additionally, the model 204B may be modified to include a reference to the inserted image by writing the reference to the model. For example, one of the document models 210 (e.g., the model associated with the active document) can be updated to include a reference to the inserted image. A one-dimensional character string may be updated to include a special character indicating the position of the image, and the reference to the image may be stored.

When the document 202 is rendered from the model associated with the active document, for example, the image content may be integrated into the document 202 that is displayed to the user. In some implementations, the one-dimensional character string may include multiple instances of an identifier for a single entity. For example, the image may be positioned at multiple locations in the document 202, specified by multiple positions for the identifier in the one-dimensional character string. Thus, a single external entity may be shared within a document, or may be shared among multiple documents—both by common references to the external entity. The document model 238 may be updated to include the inserted image(s), thus coordinating the model 204B with the document model 238. For example, changes to the model 204B may be transmitted to the document model 238 via a connection to the network 236.

Additionally, for example, the user may modify the formatting of text and entities presented in the document 202. By interacting with one of the view items 220 or with the document menu 222, the user can indicate a desired formatting change (e.g., a change such as changing a font of a selected text block to bold, changing a group of words to be organized as a list, changing a paragraph justification to be right-aligned, changing a document line spacing to be double-spaced, and the like). One of the controllers 230 or the document controller 232 can listen for user interaction with the view 206B, and upon detecting the interaction, can modify the model 204B to include the formatting change. For example, one of the document models 210 (e.g., the model associated with the active document) can be updated to include an element in a sparse map of styles defining the formatting change, and defining the locations along the one-dimensional character string at which the changes in style are to occur. A model change controller included in the per view controllers 234 can listen for events associated with the model 204B and can send a request to the view 206B to update accordingly (e.g., by rendering a display of formatted text). In some implementations, the model change controller may also handle model change events that result from collaborative model changes.

In some implementations, a document model that is one of the document models 210 may include a subset of the document data from the document model 238. For example, if the document model 238 is substantially large, a subset of the data (e.g., a subset associated with a portion of the document that is currently viewable by the user, plus perhaps a buffer area around the currently viewable area, or viewport, so that small scrolling distances may be handled by normal browser interactions without a need to render additional content form the model) may be provided to each client that is currently displaying the word processing document 202. As another example, the full document model 238 may be provided to each client.

The user may elect to view a different portion of the word processing document 202 than the user is currently viewing in the web browser. For example, by interacting with a scrollbar 214 that is associated with the document 202, the user may indicate an intent to view document data beyond the current viewport, or displayed area. One of the per view controllers 234 (e.g., the per view controller associated with the active document) can listen for user interaction with the view 206B or other appropriate component (e.g., the visual portion of the scrollbar 214), and upon detecting the interaction (e.g., via a computer mouse), can request for the view 206B to redraw itself.

If the user specifies a small amount of scrolling, the view 206A may cause itself to be displayed by the browser. For example, a buffer area of document data may be maintained in the model 204B (already rendered into a DOM) around the data that is displayed in the visible area of the document 202. If the amount of scrolling specified by the user is determined by the view 206B to be within the bounds of the buffer area of data, the document display may be updated using such pre-rendered data. If the user specifies a larger amount of scrolling, such that the scrolling specified by the user is determined by the view 206B to be outside of the bounds of the pre-rendered buffer data, for example, additional document data from the document model 238 may be downloaded via the network 236. Thus, the model 204B may be updated with information that is related to additional document sections, and the document may be rendered using the downloaded data.

Figure 2C:
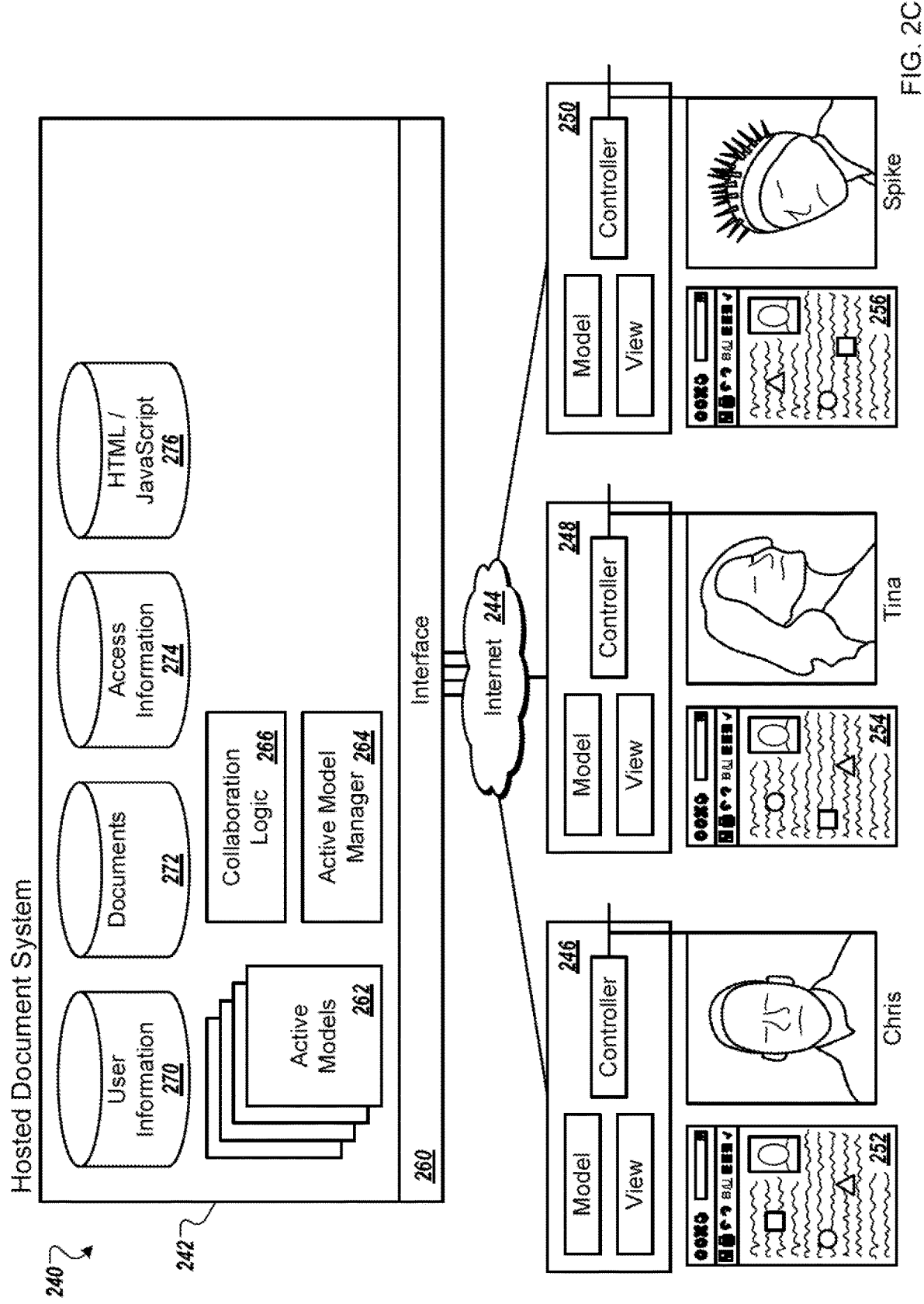
FIG. 2C is a block diagram of a system for permitting collaborative editing of a documented by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a square, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Figure 3A:
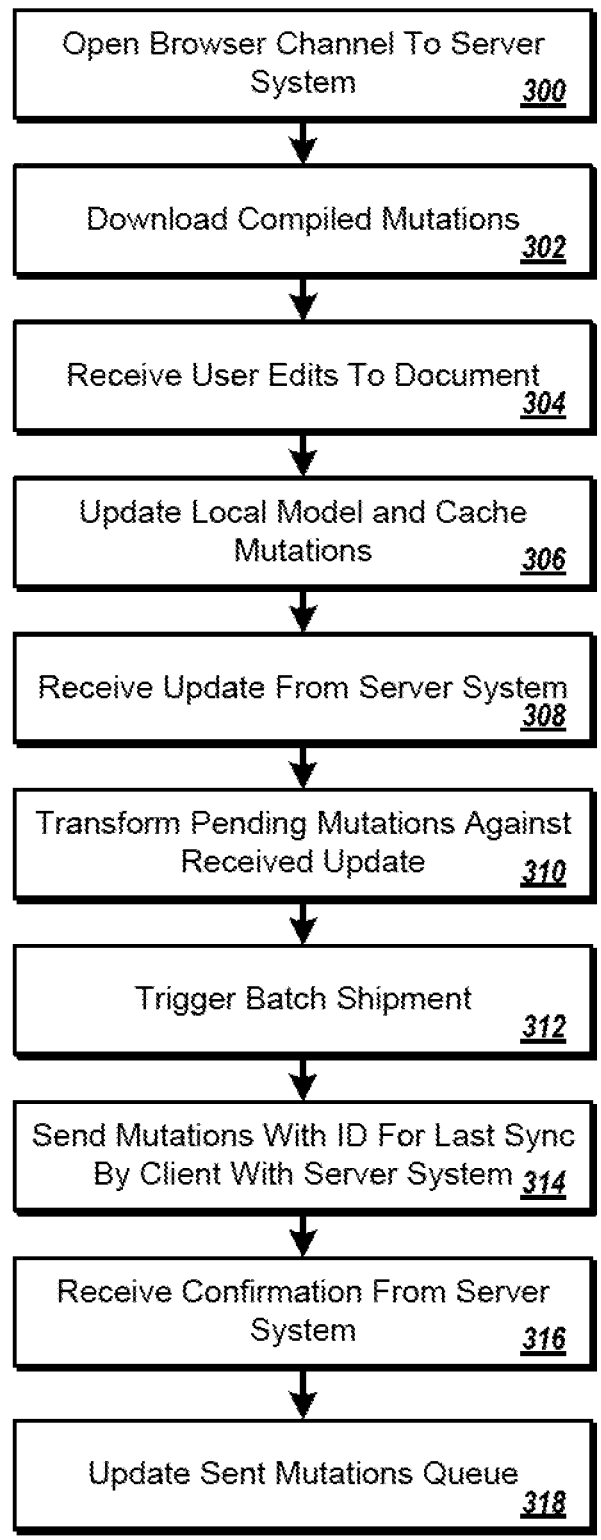
FIG. 3A is a flow chart of an example client-side process for collaborative editing of an electronic document.

Thus, the system shown in FIG. 2C may handle collaborative editing of a hosted document by multiple users at one time. The management of such editing can involve a low amount of data passing between the various sub-systems in the system FIG. 3A is a flow chart of an example client-side process for collaborative editing of an electronic document. In general, the process centers around steps that are taken when he client-side application receives input from a user of the application at essentially the same time that another user working on another client is providing input to the same document with a corresponding application at his or her client device. The process here aims to maintain a single true document on both clients and the server.

The process begins at box 300, where the client opens a browser channel to a server system. In this step, an initial communication session is opened so that subsequent communications may be instigated easily by the client and by the server system. At box 302, the client downloads a compiled set of mutations made to the model, if the client currently has an older version of the model, or may download a current version of the model from scratch. When the mutations are received, the client application may transform the stale version of the model using the mutations, so that the now-current version of the model on the client matches a fresh version of the model on the server system.

At box 304, the client system begins receiving user edits to the document. For example, a user may position a cursor at a location in the document and begin typing text into the document, and deleting text from the document. Such interaction by the user may be implemented by a model-view-controller arrangement like that described above. As one example, a controller may track the location of the cursor in the document, and may generate messages that describe mutations that the user has made to the document. Those messages may, in particular, include information that identifies a particular location in the document model that corresponds to a location on a canvas at which the mutations were made by the user.

At box 306, the client device updates its own local model to reflect the received mutations, and caches those mutations. The client device may build up a list of mutations in the cache to minimize the number of transmissions that need to be sent to the server system. However, the timing of the uploads may be set such that a user of the client device or another client device does not get too far out-of-sync with other users who are editing the document at the same time. At box 308, the client device receives an update from the server system, which may be a set or batch of mutations that were previously submitted to the server system by another client device in the top been processed and forwarded from the court from the server system to the first client device. Thus, in this example, there are overlapping mutations in time that may the effect of interfering with each other.

At box 310, the client device transforms its own mutations against the received update. Thus, as one simple example, if the client device had previously recorded the inputs from its user as occurring in a particular location in the document, and mutations received from the server system were provided in an earlier location in the document, the location for the input provided on the client device may be shifted backward by an indexed amount that matches the number of characters in the received mutations. Other transformations that follow from a standard operational transformation rule set may also be applied as is appropriate at this portion of the process. In implementations in which the first client has already placed its own mutations into a view of the model, the view may be updated from the newly transformed model, such as by rendering the newly transformed model into a DOM that is accessible to a web browser that the user is employing.

At box 312, the device determines that it has been collecting inputs from its user long enough, and triggers a batch shipment to the server system of mutations provided by its user. At box 314, those cached mutations are sent to the server system. In addition, an identifier for the last synchronization that the client had with the server system may be sent. Such an identifier may be used by the server system so as to properly set a baseline for transformations that it will need to perform on the newly received mutations from the first client.

In addition, the first client may provide an identifier for itself, or the server system may otherwise determine that the particular mutations have arrived from that client. Such information may be useful in permitting the server system to keep track of the source of various mutations, and to link mutations to particular users, so that, for example, the server system can make appropriate transformations to batches of mutations that it receives and can forwarded transformed mutations to the appropriate other clients. Also, the server system may pass identifying information for a first client to other clients so that each client application may show a tag next to newly entered or edited text, where the tag is a pop-up that indicates the identity of user who performed the editing or entry. The user identifications may be stored, at least temporarily, in the various versions of the document model, so that users can, for example, hover over a portion of text, and see a pop-up box that indicates the identity of the user who provided the text, and optionally a date stamp to indicate when the particular edit occurred.

At box 316, the client receives confirmation from the server system that the batch of mutations has been entered at the server system. Such confirmation may cause the client system to dump the pending mutation from a queue that tracks pending mutations, and also to index its revision number forward one position (box 318).

In this manner, a client device may operate optimistically in updating its own version of a document model, and may also have some assurance that its version of the document model will match, or will be matched, relatively quickly to other versions of the document model in the system. The end result is that users who are editing or operating in a document in a collaborative fashion may quickly see changes that they have made and the other users have made, and interference between the changes may be conveniently handled in a manner that maintains the integrity of each of the versions of the document.

Figure 3B:
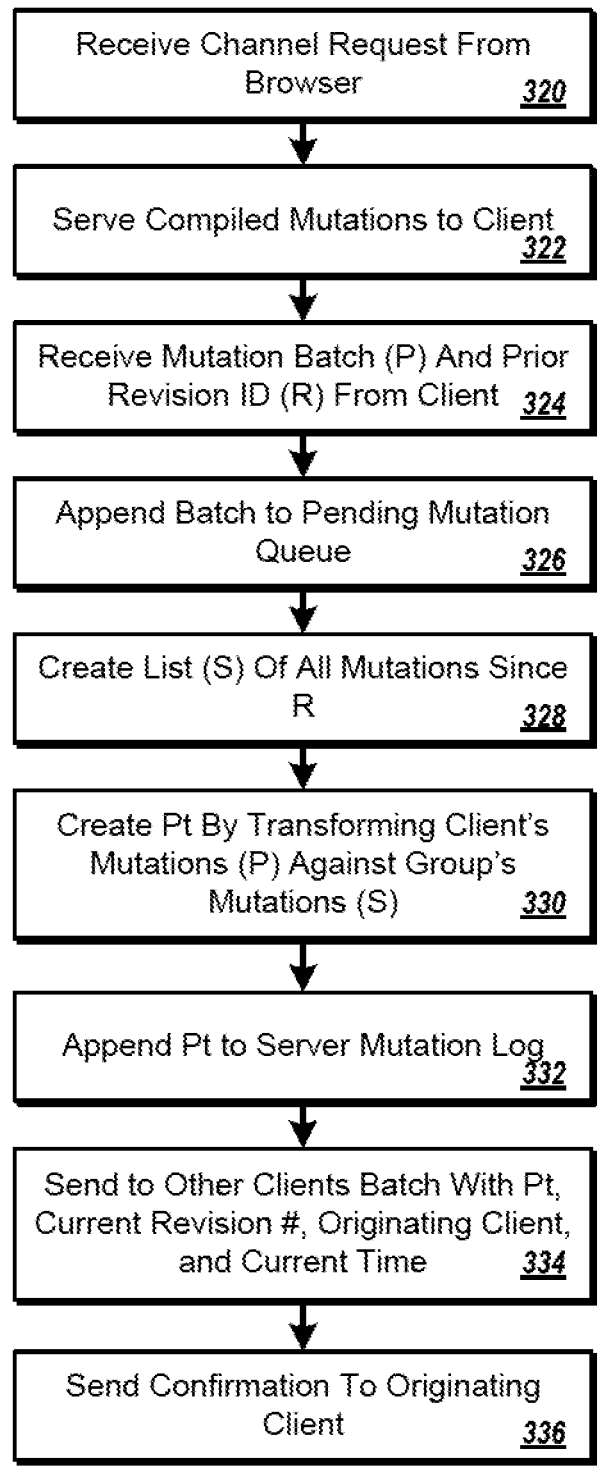
FIG. 3B is a flow chart of an example server-side process for collaborative editing of an electronic document.

FIG. 3B is a flow chart of an example server-side process for collaborative editing of an electronic document. In general, the process highlights actions that may be performed on a central server system that is coordinating edits made to a common document in a collaborative manner by multiple users at different client computing devices.

The process begins at box 320, where the server system receives a channel request from one or more browsers. Upon receiving a request, the server system may open the channel, and may serve to the requesting browser a list or group of compiled mutations. Such mutations may be calibrated to include all mutations that have occurred since the particular client device was last provided mutations for updating of its document model. The server system may then wait to receive information from the various clients that are currently active in a session and may remain idle during such a period.

At box 324, a communication is received from one of the clients. The communication consists of a batch of mutations which may be termed "P" in this example, and an identifier for the last revision that the client has recorded as being synchronized between the client and the server system, which will be denoted "R" here. At box 326, the server system appends the received batch from the particular client to a queue of pending mutations. In certain implementations, where the server system is able to process requests as fast as they arrive, a queue will not be necessary, or in certain situations, different queues may be maintained for each of the clients, and may be coordinated so that they are processed according to the time at which the particular request arrived.

At box 328, the server system creates a list, denoted as the letter "S", of all mutations that arrived since the last batch of mutations from the particular client have been processed, as indicated by the letter "R." At box 330, the server system transforms the newly-received mutations from the client against the mutations received from the group of clients since time "R," and such processing is used to create a group of transformed mutations referenced here as $P_t$. This newly created entity is then appended to the server mutation log and is processed in due course by the server system (box 332).

The server system may then send communications to each of the clients regarding the received mutations. For example, at box 336, the server system sends a confirmation message back to the originating client for the batch of vacations, so that the originating client may know that its mutations were received and processed, and may index its revision tracking number forward a position. At box 334, in contrast, the server system may send information to the other client so that they may implement the mutations received from the first client in appropriate manners. To do so, the server system may send the $P_t$ batch to all the clients other than the submitting client, a revision number for that batch, an identification of the originating client for the mutations, and a current time, where such information is appropriate. Each of the other clients may then process the received information in an appropriate manner, such as by using mechanisms described above, including the process described in FIG. 3A.

Figure 4:
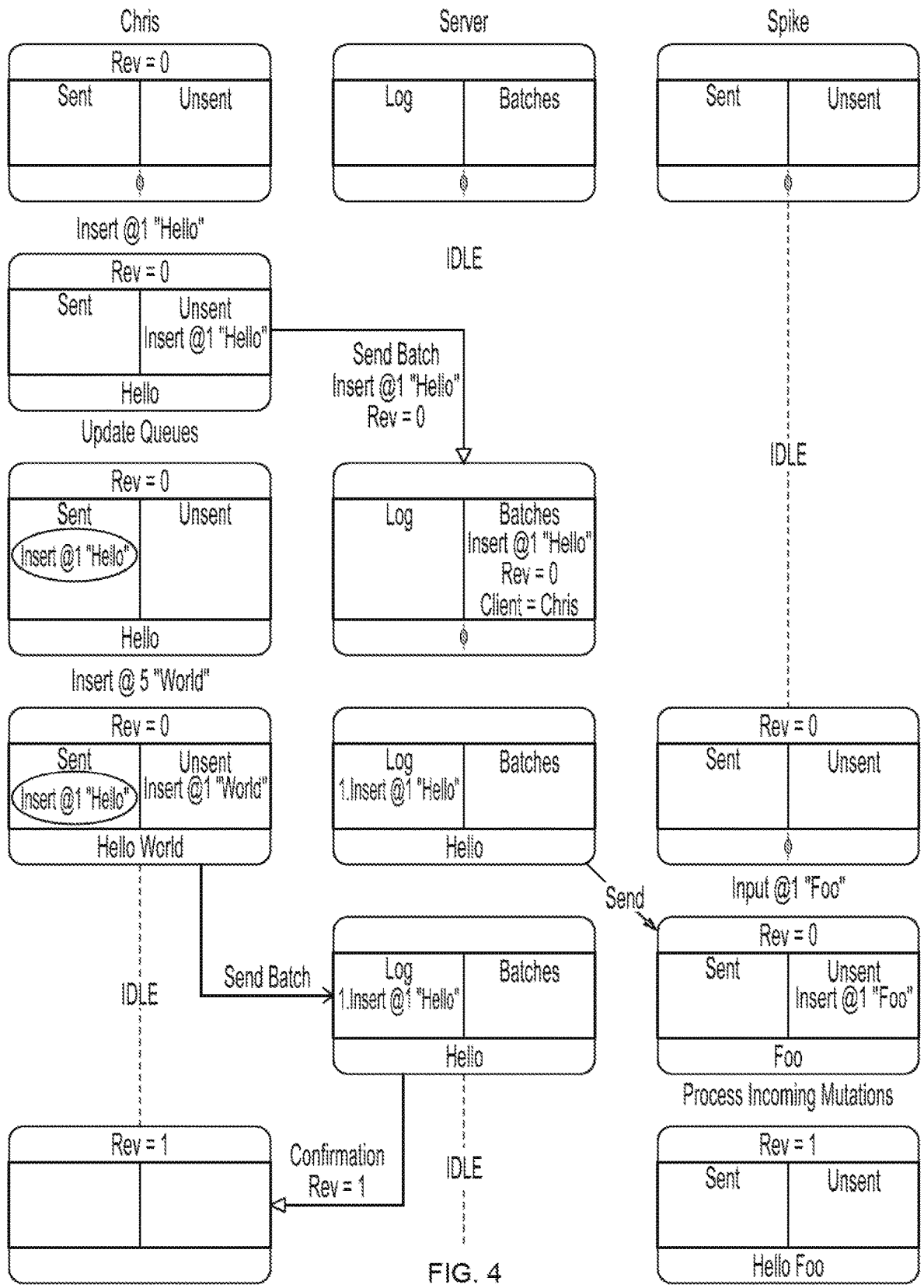
FIG. 4 is an activity diagram showing status of two clients and a server at various steps in a document collaboration process.
Figure 5:
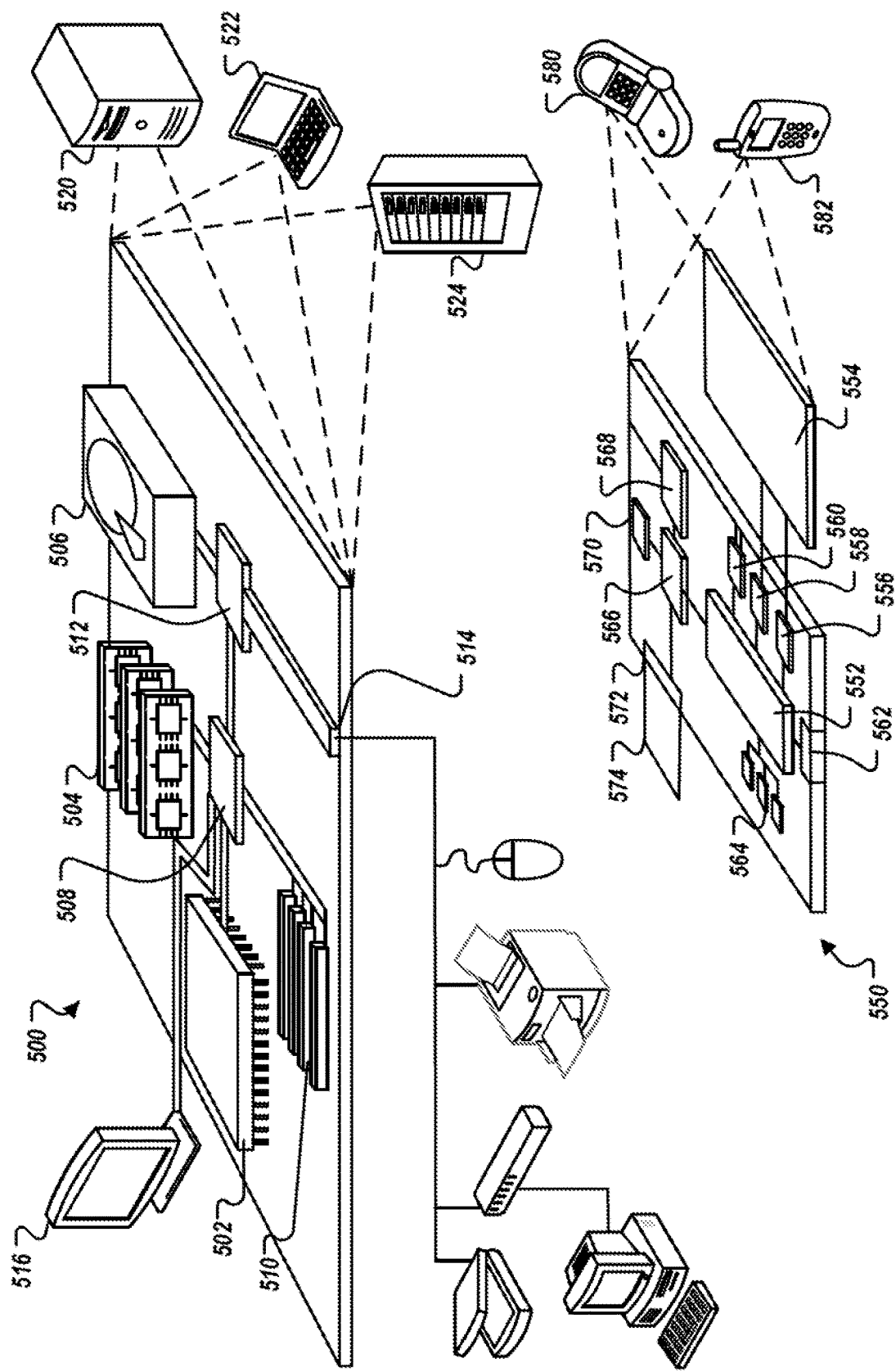
FIG. 5 shows an example of a computer device and a mobile computer device that can be used to implement the techniques described here.

FIG. 4 is an activity diagram showing status of two clients and a server at various steps in a document collaboration process. In general, the process shows how text typed by the two different users of the two clients may be propagated through the server and passed to the other client. In the top row, each of the sub-systems is simply initialized. Each client may track the number of revisions it has sent to the server, and that number may initially set to zero. The sent and unsent queues for the client application (in the middle of each box for both clients) are also empty, and the output of the client-stored models is an empty set. Likewise, the server system has no document to display yet, and also nothing to place in log or batches storage.

After the first row of boxes in time, user Chris types the message "Hello", which appears in the document on Chris's device, and is reformatted into a mutation of the form: insert @1 "Hello". That mutation then enters Chris' unsent queue for a short period, such as a small fraction of a second, and is then transmitted to the to the server system, along with an indication that the revision number is 0. The device for Chris also updates its queues. Specifically, to show that the first revision has been sent. Through this time, user Spike has not been interacting with his word processing application, so both the server system and Spike's client have been idle through this period.

In the third row then, Chris's queues have been updated, and the server now has a batch to be processed that includes the mutation, the revision number passed by Chris's client device, and an identifier to indicate that the edits came from Chris.

Between rows three and four, Chris has continued typing and the server system has processed the submission of the first mutation (or more properly, a batch of five mutations) by transforming the received mutations against its own version of the model. Thus, by row four, the original mutation from Chris's device has moved into the log for the server system and has been assigned a logging number. At the same time the unsent queue on Chris's machine has received the term "world" from Chris's continued typing on his client device. Again, Spike has remained quiet At row five, a couple interesting actions occur. First, the server system recognizes the presence of the first revision in its log, and sends a confirmation message back to Chris's device. Second, Chris's second set of mutations has arrived at the server system and is waiting to be processed. Third, Spike has begun typing at his device, and has entered the letters "foo". Thus, after the row of boxes in the fifth row, multiple messages are being sent, including an upload of Spike's first revision, a confirmation of Chris's first revision, and a reporting to Spike of Chris's first revision.

In the sixth row of boxes, Chris's device has incremented its revision number as a result of receiving the confirmation, so that it can properly track and compare mutations or batches of mutations when mutations are received from Spike via the server system. Also, the server system has receive Spike's mutations and is processing Chris's second set of mutations. And Spike's computer is transforming its pending mutations against the mutations from Chris that were just received from the server system. In this manner, Spike's computer will be performing the same mutations performed by the server system, and will not give his own entry prominence over Chris's first entry. The process, of course, may continue as each of Chris and Spike enter and edit text in their own copies of the document model, and the various document models are processed so as to bring them back into line with each other.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLEO (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TOMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location- related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for coordinating documents between computer systems, the method comprising:
   maintaining, by a server system, a master copy of an electronic document;
   providing, by the server system, a first client copy of the electronic document to a first client computing device, wherein the first client copy of the electronic document is associated with a first user account of a plurality of user accounts, and wherein the plurality of user accounts have access to respective client copies of the electronic document;
   receiving, from the first client computing device and by the server system, a first batch of mutations and a first revision identifier indicative of a latest revision number of the first client copy of the electronic document that has been synchronized with the master copy of the electronic document at the server system;
   adding the first batch of mutations to a queue of pending mutations;
   identifying, by the server system and based on the first revision identifier, a record of mutations that have been received from other user accounts of the plurality of user accounts and that have been received since the latest revision number of the first client copy of the electronic document has been synchronized with the master copy of the electronic document at the server system;
   transforming, by the server system, the first batch of mutations from the queue of pending mutations against mutations of the record of mutations to create a first group of transformed mutations;
   updating, by the server system, the master copy of the electronic document with the first group of transformed mutations at the server system; and
   sending, by the server system, a confirmation message to the first client computing device indicating that the first batch of mutations have been synchronized with the master copy of the electronic document and that the first revision identifier is to be updated to a second revision identifier.

2. The method of claim 1, further comprising:
   sending the first group of transformed mutations at the server system to a second client computing device associated with a second user account of the plurality of user accounts.

3. The method of claim 1, further comprising:
   receiving, from a second client computing device and by the server system, a second batch of mutations associated with a second client copy of the electronic document, wherein a first change from the first batch of mutations and a second change from the second batch of mutations include conflicting edits to a same part of the electronic document.

4. The method of claim 3, further comprising:
   identifying a set of conflict resolution scenarios including a first conflict resolution scenario and a second conflict resolution scenario relating to the conflicting edits, wherein:
   the first conflict resolution scenario transforms the first change to conform with the second change, and
   the second conflict resolution scenario transforms the second change to conform with the first change; and
   sending, to the first client computing device, a message presenting the set of conflict resolution scenarios.

5. The method of claim 3, further comprising:
   determining that the first change has a higher priority than the second change.

6. The method of claim 5, further comprising:
   rejecting the second change to the master copy of the electronic document; and
   synchronizing the second client copy with the master copy of the electronic document.

7. A non-transitory computer-readable medium storing instructions, that responsive to execution by a computer processor, cause the computer processor to:
   maintain a master copy of an electronic document at a server system;
   provide a first client copy of the electronic document to a first client computing device, wherein the first client copy of the electronic document is associated with a first user account of a plurality of user accounts, and wherein the plurality of user accounts have access to respective client copies of the electronic document;
   receive, from the first client computing device, a first batch of mutations and a first revision identifier indicative of a latest revision number of the first client copy of the electronic document that has been synchronized with the master copy of the electronic document at the server system;
   add the first batch of mutations to queue of pending mutations;
   identify, based on the first revision identifier, a record of mutations that have been received from other user accounts of the plurality of user accounts and that have been received since the latest revision number of the first client copy of the electronic document has been synchronized with the master copy of the electronic document at the server system;

transform the first batch of mutations from the queue of pending mutations against mutations of the record of mutations to create a first group of transformed mutations;

update the master copy of the electronic document with the first group of transformed mutations at the server system; and send a confirmation message to the first client computing device indicating that the first batch of mutations have been synchronized with the master copy of the electronic document and that the first revision identifier is to be updated to a second revision identifier.

8. The non-transitory computer-readable medium of claim 7, the computer processor further to:

send the first group of transformed mutations to a second client computing device associated with a second user account to the plurality of user accounts.

9. The non-transitory computer-readable medium of claim 7, the computer processor further to:

receive, from a second client computing device, a second batch of mutations associated with a second client copy of the electronic document, wherein a first change from the first batch of mutations and a second change from the second batch of mutations include conflicting edits to a same part of the electronic document.

10. The non-transitory computer-readable medium of claim 9, the computer processor further to:

determine that the first change has a higher priority than the second change.

11. The non-transitory computer-readable medium of claim 10, the computer processor further to:

reject the second change to the master copy of the electronic document.

12. The non-transitory computer-readable medium of claim 11, the computer processor further to:

synchronize the second client copy with the master copy of the electronic document.

13. A system comprising:

a memory; and a processor, coupled to the memory, the processor to:

maintain a master copy of an electronic document at a server system;

provide a first client copy of the electronic document to a first client computing device, wherein the first client copy of the electronic document is associated with a first user account of a plurality of user accounts, and wherein the plurality of user accounts have access to respective client copies of the electronic document;

receive, from the first client computing device, a first batch of mutations and a first revision identifier indicative of a latest revision number of the first client copy of the electronic document that has been synchronized with the master copy of the electronic document at the server system;

add the first batch of mutations to a queue of pending mutations;

identify, based on the first revision identifier, a record of mutations that have been received from other user accounts of the plurality of user accounts and that have been received since the latest revision number of the first client copy of the electronic document has been synchronized with the master copy of the electronic document at the server system;

transform the first batch of mutations from the queue of pending mutations against mutations of the record of mutations to create a first group of transformed mutations;

update the master copy of the electronic document with the first group of transformed mutations at the server system; and send a confirmation message to the first client computing device indicating that the first batch of mutations have been synchronized with the master copy of the electronic document and that the first revision identifier is to be updated to a second revision identifier.

14. The system of claim 13, the processor further to:

send the first group of transformed mutations to a second client computing device associated with a second user account to the plurality of user accounts.

15. The system of claim 13, the processor further to:

receive, from a second client computing device, a second batch of mutations associated with a second client copy of the electronic document, wherein a first change from the first batch of mutations and a second change from the second batch of mutations include conflicting edits to a same part of the electronic document;

determine that the first change has a higher priority than the second change;

reject the second change to the master copy of the electronic document; and synchronize the second client copy with the master copy of the electronic document.

* * * * *